US006536958B2

(12) United States Patent
Liu

(10) Patent No.: US 6,536,958 B2
(45) Date of Patent: Mar. 25, 2003

(54) OPTICAL DEVICE PACKAGE WITH HERMETICALLY BONDED FIBERS

(75) Inventor: Jay Guoxu Liu, North Andover, MA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 15 days.

(21) Appl. No.: 09/741,417

(22) Filed: Dec. 20, 2000

(65) Prior Publication Data

US 2002/0110343 A1 Aug. 15, 2002

(51) Int. Cl.[7] .................................................. G02B 6/36
(52) U.S. Cl. ......................................................... 385/92
(58) Field of Search .............................. 385/92, 93, 94, 385/88, 89, 14, 138

(56) References Cited

U.S. PATENT DOCUMENTS

| 3,857,161 | A | * | 12/1974 | Hutchins, IV | 228/121 |
|---|---|---|---|---|---|
| 3,954,486 | A | | 5/1976 | Francel et al. | |
| 4,224,927 | A | * | 9/1980 | Patil | 126/675 |
| 4,469,399 | A | * | 9/1984 | Cowen et al. | 385/138 |
| 4,568,563 | A | * | 2/1986 | Jackson et al. | 427/40 |
| 4,663,652 | A | | 5/1987 | Nishizawa | |
| 4,708,429 | A | | 11/1987 | Clark et al. | |
| 4,877,303 | A | | 10/1989 | Caldwell et al. | |
| 5,011,246 | A | | 4/1991 | Corradetti et al. | |
| 5,560,760 | A | | 10/1996 | Toeppen | |
| 5,737,467 | A | | 4/1998 | Kato et al. | |
| 5,815,616 | A | | 9/1998 | Bishop et al. | |
| 5,881,198 | A | * | 3/1999 | Haake | 385/136 |
| 5,905,832 | A | * | 5/1999 | Alfille et al. | 385/92 |
| 5,940,558 | A | | 8/1999 | Bishop et al. | |
| 6,034,424 | A | | 3/2000 | Fujimura et al. | |
| 6,122,430 | A | * | 9/2000 | Bookbinder et al. | 385/137 |
| 6,134,363 | A | * | 10/2000 | Hinson et al. | 385/100 |
| 6,243,527 | B1 | * | 6/2001 | Dawson-Elli | 385/136 |
| 6,257,772 | B1 | * | 7/2001 | Nakanishi et al. | 385/89 |
| 6,263,137 | B1 | * | 7/2001 | Yoneyama et al. | 385/49 |
| 6,293,711 | B1 | * | 9/2001 | Sasaki | 385/88 |

OTHER PUBLICATIONS

Understanding Fiber Optics, Fiberoptic Product News, Lasera & Applications, Jeff Hecht, 1987 No month.
Fiber Optics Handbook for Engineers and Scientists, Frederick C. Allard, pp. 3.38–3.50, McGraw–Hill No date.

* cited by examiner

*Primary Examiner*—Lynn Field
*Assistant Examiner*—Thanh-Tam Le

(57) ABSTRACT

A method for securing a glass fiber to a housing includes positioning the glass fiber in proximity to the wall of a housing and applying a quantity of solder glass frit to the surface of the glass fiber. Sufficient solder glass frit is employed so as to occupy the gap between the glass fiber and the housing. The solder glass frit has a melting point lower than that of the glass fiber. The surface of the glass fiber is not metallized. Upon heating the solder glass frit softens and adheres to both the glass fiber and the wall of the housing. The fused solder glass frit secures the glass fiber to the housing and forms an hermetic seal therebetween.

20 Claims, 3 Drawing Sheets

OPTICAL DEVICE PACKAGE WITH HERMETICALLY BONDED FIBERS

BACKGROUND

1. Field of the Invention

The present invention relates to an optical device package, and more particularly to an optical device package including one or more hermetically bonded optical fibers, and a method for making same.

2. Background of the Art

Optical device packages are known in the art. Typically such packages include one or more optical fibers such as those used in communications, a housing, and means to secure the terminal portion of the optical fiber within the housing. Optical fibers are typically fabricated from fused silica or specialty glasses having very low absorption of light for wavelengths used for communications. The housing can be adapted to engage other optical devices so as to act as a connector. The optical fiber can act as a transmitter, wherein the optical signal carried by the fiber exits the end of the fiber, or a receiver, in which the end of the fiber receives a signal from an external source. Optical device assemblies can include both transmitters and receivers.

Because the optical fibers are usually of very small diameter and require a highly precise alignment, it is necessary to stabilize the position and orientation of an optical fiber in an optical device by securing it to the housing. One way of securing the optical fiber includes the use of a metal solder, e.g., tin-lead alloy, which has a melting point lower than that of the fiber. For example, U.S. Pat. No. 4,708,429 to Clark et al., which is herein incorporated by reference, discloses a method of securing the optical fiber by metallizing a portion of the length of the fiber with chromium and gold to enhance the subsequent wetting of the fiber by metal solder.

However, this method has disadvantages in that it requires the step of applying a coating of metal to the glass fiber to promote adhesion of a metal solder. This step adds to the time and cost of manufacture. It would be desirable to have a simpler method of securing a glass fiber to a housing.

SUMMARY

A method for securing a glass fiber to a housing. The method comprises the steps of: (a) providing a housing having a wall; (b) positioning the glass fiber in proximity to the wall, the glass fiber having a non-metallized surface; (c) applying a quantity of solder glass frit to the glass fiber, the solder glass frit being in contact with both the housing wall and the non-metallized surface of the glass fiber and having a melting point below the melting point of the glass fiber; and (d) heating the solder glass frit to a temperature sufficient to at least soften the solder glass frit so as to form a seal between the non-metallized surface of the glass fiber and the housing wall.

The method herein advantageously avoids the step of metallizing the surface of the glass fiber, which would be necessary if metal solder were used instead of fiber glass frit.

BRIEF DESCRIPTION OF THE DRAWINGS

Various embodiments are described below with reference to the drawings wherein.

DETAILED DESCRIPTION OF THE PREFERRED EMBODIMENTS

Optical fibers for use in the present invention are fabricated from a glass typically composed of fused silica with or without other components and are characterized by a melting point of at least about 1,000° C., preferably at least about 1,100° C., and more preferably at least about 1,200° C.

Figure 1:
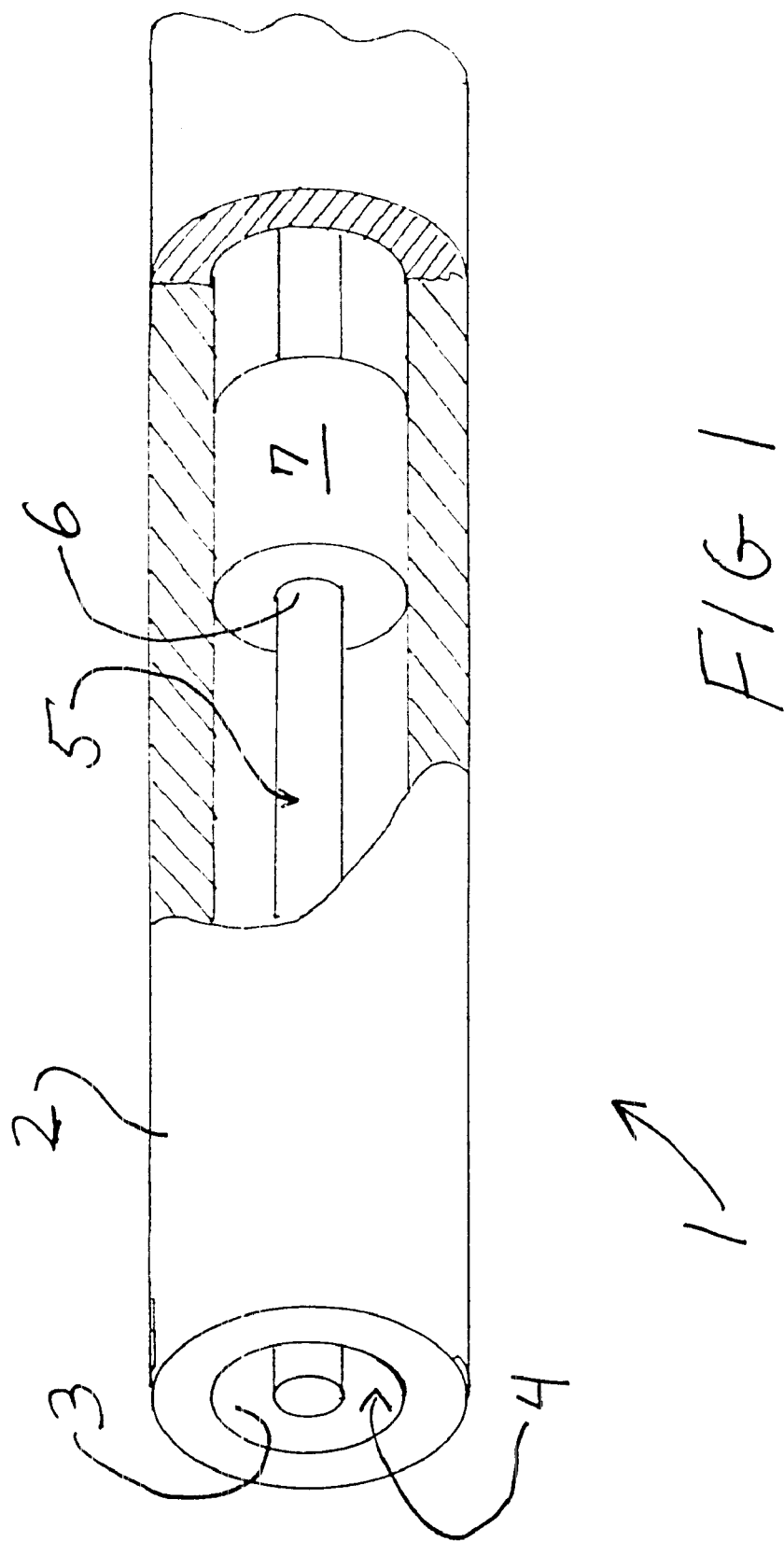
FIG. 1 is a cutaway partly sectional perspective view of an optical fiber secured in a housing.

In general, the method herein broadly relates to the securing of a optical glass fiber in a housing. Referring now to FIG. 1, a fiber optic device 1 includes a tubular housing 2 having an interior wall 3 defining an axial aperture 4 having a first diameter. The housing 2 can be made from a metal such as steel, copper, brass, aluminum, or nickel, and alloys such as Kovar, Invar, and copper-tungsten (Cu—W). Alternatively, housing 2 can be fabricate from glass, ceramics and the like. An optical glass fiber 5 is inserted into axial aperture 4, the optical glass fiber 5 having a non-metallized circumferential surface 6 with a second diameter. The optical glass fiber second diameter is less than the axial aperture first diameter so as to define a gap between the interior wall 3 of the housing and the outer circumferential surface 6 of the glass fiber. A quantity of solder glass frit 7 is applied to a portion of the outer non-metallized circumferential surface 6 of the optical glass fiber sufficient to completely occupy the gap between the surface 6 of the optical glass fiber 5 and the interior wall 3 of the housing. The solder glass frit is heated to a temperature sufficient to at least soften the solder glass frit so as to form an hermetic seal between the non-metallized surface 6 of the glass fiber and the interior wall 3 of the housing. The fiber optic device 1 can be an optical connector and can be a transmitter or receiver of optically transmitted information carrying signals such as used in communication networks.

To provide a more detailed illustrative embodiment, the invention herein is discussed below in conjunction with an optical fiber assembly such as that disclosed in U.S. Pat. No. 4,708,429 to Clark et al. However, such use is exemplary and not contemplated as limiting the scope of the present invention.

Figure 2:
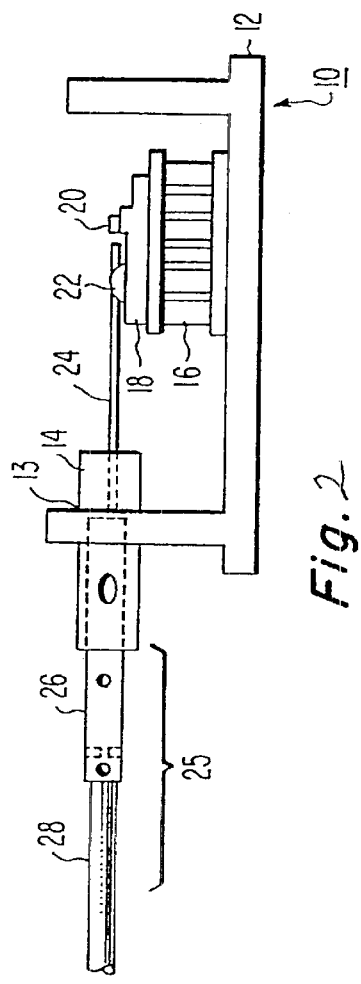
FIG. 2 is a cross-sectional view of an optically coupled device package.

Referring now to FIG. 2, an optically coupled device package 10 comprises a frame 12 with an aperture 13 extending through one of its walls. Optionally, a neck 14 can extend through the aperture 13. Mounted within the frame 12 is an optional thermoelectric cooler 16 which controls the temperature of the base plate 18, and an optical device 20 mounted thereon. The optical device 20 can be a laser, LED, or detector. An optical fiber assembly 25 comprising an optical cable 28 secured within a cable housing 26 is sealed within the aperture 13 or neck 14. Housing 26 can be fabricated from the materials indicated above with respect to housing 2. A lid, not shown, is ultimately sealed to the top of the frame 12. The frame 12, neck 14 and lid can be of a metal such as copper or brass. For a hermetic package, the seals between the glass optical fiber 24 and housing 26, the housing 26 and aperture 13 or neck 14, the neck 14 and the aperture 13, and the lid and the frame 12, should be hermetically tight.

Figure 3:
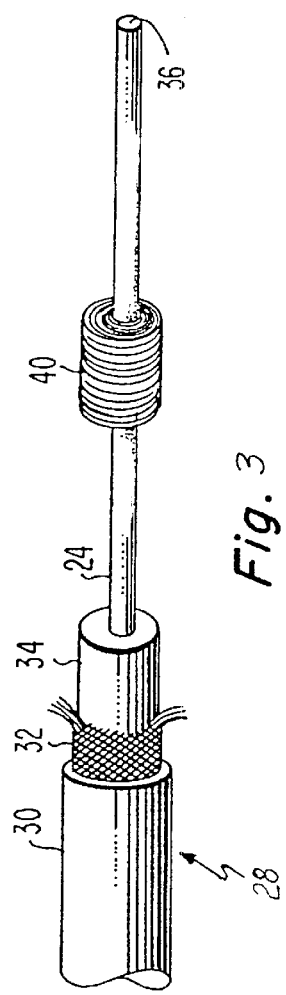
FIG. 3 is a perspective view of an optical cable prepared for assembly.

In FIG. 3 the cable 28 includes an outer jacket 30 around a fibrous support layer 32 (e.g., of Kevlar®, a registered trademark of the DuPont Company). Inside the fibrous layer 32 is a protective coating 34 which overlies the optical fiber 24. The protective coating 34 is typically a resilient synthetic material, e.g., acrylate, polypropylene, nylon, teflon or the like. This protective coating 34 should be stripped away to expose a length of the optical fiber 24 sufficient for coupling. In contrast to the method disclosed in U.S. Pat. No. 4,708,429, the optical fiber 24 is not metallized. The soldering agent, i.e., solder glass frit, is applied directly to the uncoated surface of the optical fiber 24. Overlying a portion of the exposed length of the optical fiber 24 is a solder preform 40 which may be a tight wire wrap or a cylindrical preform of the desired solder glass frit material. The preform 40 is heated sufficiently so that the preform 40 wets the optical fiber 24. The outside diameter of the preform 40 should be about equal to that of the protective coating 34.

Solder glass frit for use in the present invention is a low melting point glass, for example, lead borate glass, lead-zinc-borate glass and the like. A composition range for a solder glass frit suitable for the present invention is as follows:

TABLE 1

| Oxide | Broad Range | Usual Range |
|---|---|---|
| lead oxide (PbO) | 70–85 | 75–85 |
| zinc oxide (ZnO) | 0–20 | 2–16 |
| boron oxide ($B_2O_3$) | 5–15 | 8–15 |
| silica ($SiO_2$) | 0–10 | 0–5 |
| barium oxide (BaO) | 0–3 | 0–2 |
| tin oxide ($SnO_2$) | 0–5 | 0–2 |

A suitable solder glass for use in the present invention is disclosed in U.S. Pat. No. 5,560,760 to Toeppen and is commercially available under the designation FK-3 from Schott Glass Technologies of Duryea, Pa. Also suitable are high lead content glass frit slurries available from Corning which can be applied like solder to a glass fiber. Generally, this solder glass frit has a melting point no higher than about 500° C., preferably no higher than about 450° C., and most preferably no higher than about 400° C. The coefficient of thermal expansion of the solder glass frit preferably matches that of the glass fiber and the housing material.

Figure 4:
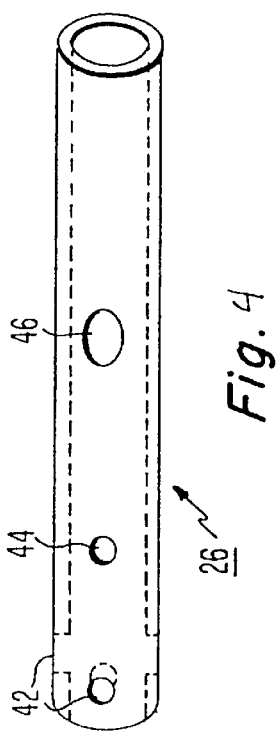
FIG. 4 is a perspective view of the support sleeve of FIG. 2.

FIG. 4 shows the housing 26 of FIG. 2, which comprises a body with an axial opening therethrough. Anchor holes 42, extending to the opening, are provided through the walls of the housing 26 near a first end. A test port 44 is provided through the side of the housing 26 and is located between the anchor holes 42 and a solder window 46. The outside diameter of the housing 26 is about equal to the inside diameter of the neck 14 of FIG. 2. The inside diameter of the housing 26 is about equal to the diameter of the protective coating 34 of the optical cable 28 of FIG. 3. The housing 26 can be of a metal, such as copper or brass.

Figure 5:
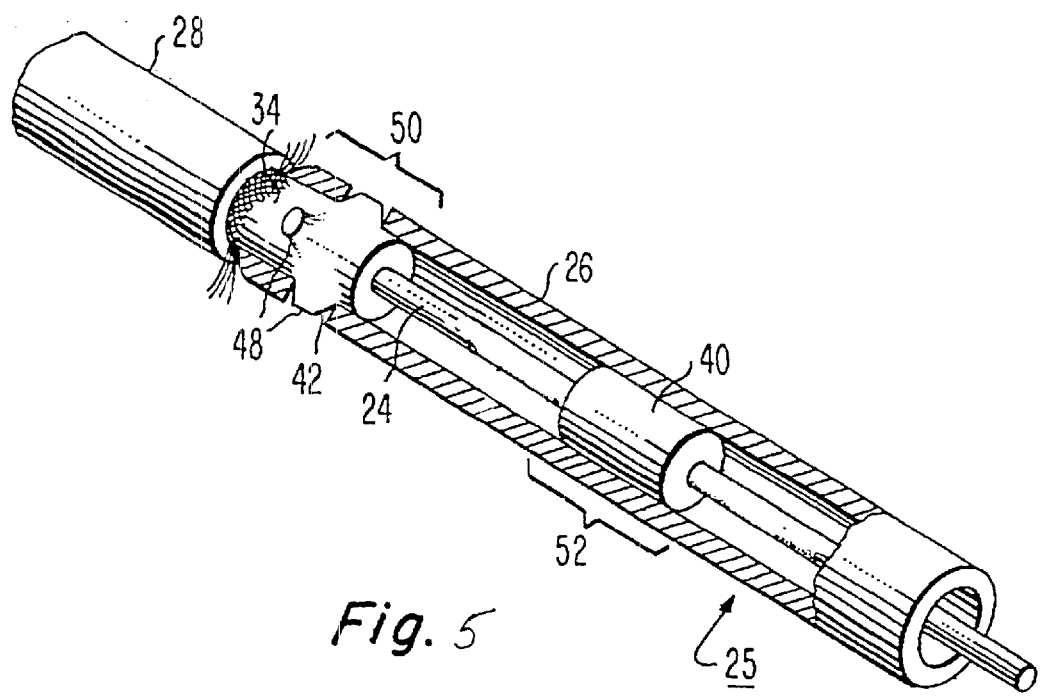
FIG. 5 is a perspective view partially cutaway of an optical fiber assembly.

FIG. 5 illustrates an optical fiber assembly 25 comprising an optical cable 28 which has been inserted in one end of, and axially through, said housing 26. The cable 28 is positioned such that the protective coating 34 is adjacent the anchor holes 42. Nodules 48, integral with the protective coating 34, are formed in the anchor holes 42. This can be done by causing the protective coating 34 to flow into the anchor holes 42 forming the nodules 48, e.g. by heating. Alternatively, small portions of the material that can be fused with the protective coating 34 can be inserted into the holes 42 to form the nodules 48. The nodules 48 make up a physical anchor 50 in the area of the anchor holes 42 giving the optical cable 28 stability within the housing. Typically, the solder glass preform 40 is located adjacent window 46 of FIG. 4. At this point, the housing is heated while a solder glass frit is introduced through the window 46 which wets to the preform 40 and the inside of the housing 26 to form the seal 52, which can be hermetic.

Since the optical fiber 24 is now physically anchored and sealed with the housing 26 of the optical fiber assembly 25, breakage of the fiber 24 near the area of the protective coating 34 is eliminated. The optical fiber 24 may be of any desired length within, or extending from, housing 26.

Figure 6:
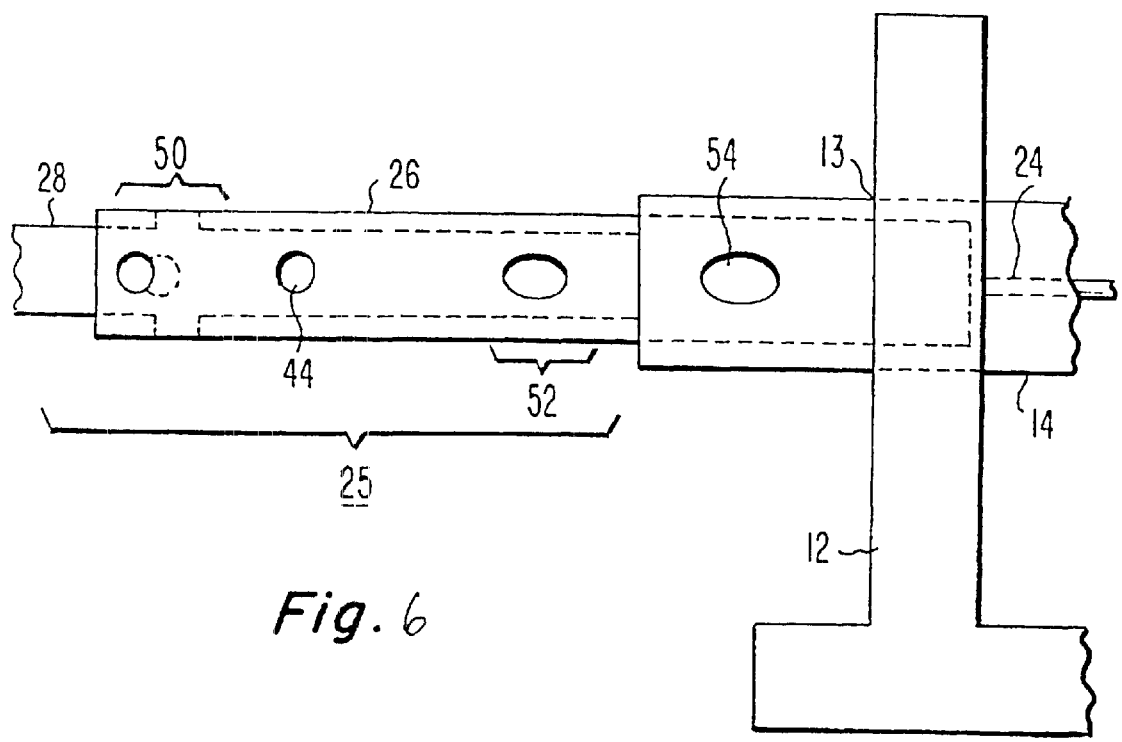
FIG. 6 is a perspective view of the fiber assembly of FIG. 5 in cooperation with the housing.

The fiber assembly 25 is inserted into the neck 14 as shown in FIG. 6. Specifically, a second end of the support sleeve 26 is positioned within the neck 14 such that the optical fiber 24 can be aligned with the optical device 20 of FIG. 2. The optical fiber 24 can be held in alignment by a bonding material of solder glass frit 22, as shown in FIG. 2. The housing 26 may be fastened in this position within the neck 14 by any convenient means. For example, an aperture 54 may be provided in the side of the neck 14 through which a molten metal solder or solder glass frit can be added.

If the package 10 is to be hermetically sealed prior to sealing the lid (not shown) onto the frame 12, the reliability of seal 52 can be verified by known techniques such as applying a vacuum to the top of the frame 12 and introducing a source of helium gas near to the joints to be tested. The optional test port 44 in FIG. 6 is provided for introduction of helium. The test port 44 of FIG. 6 is located between the physical anchor 50 and the seal 52 to insure that it is the seal 52 that is tested during a leak check. Therefore, as shown in FIG. 5, the protective coating 34 should be stripped back beyond the port 44.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for securing a glass fiber to a housing comprising the steps of:
   a) providing a housing having a wall;
   b) positioning the glass fiber in proximity to the wall, said glass fiber having a circumferential uncoated outer surface;
   c) applying a quantity of solder glass frit directly to a circumferential uncoated outer surface of the glass fiber, said solder glass frit being in direct contact with both the housing wall and the circumferential uncoated outer surface of the glass fiber, and said solder glass fit having a melting point below the melting point of the glass fiber; and
   d) heating the solder glass frit to a temperature sufficient to at least soften the solder glass frit so as to form a hermetic seal between the circumferential uncoated outer surface of the glass fiber and the housing wall.

2. The method of claim 1 wherein the housing wall is an interior wall defining an axial aperture.

3. The method of claim 2 wherein the step of positioning the glass fiber comprises inserting the glass fiber into the axial aperture.

4. The method of claim 3 wherein there is a gap between the circumferential uncoated outer surface of the glass fiber and the housing interior wall.

5. The method of claim 4 wherein the solder glass frit substantially completely occupies the gap between at least a portion of the circumferential uncoated outer surface of the glass fiber and the housing interior wall so as to form said hermetic seal.

6. The method of claim 1 wherein the housing is fabricated from a material selected from the group consisting of steel, copper, brass, aluminum, nickel, Kovar alloy, Invar alloy, copper-tungsten alloy, glass and ceramic.

7. The method of claim 1 wherein the glass fiber is fabricated from a material which includes fused silica.

8. The method of claim 1 wherein the glass fiber has a melting point of at least 1000° C.

9. The method of claim 1 wherein the solder glass frit has a melting point of no more than about 500° C.

10. The method of claim 1 wherein the solder glass frit comprises lead oxide and boron oxide.

11. The method of claim 10 wherein the solder glass frit further comprises a material selected from the group consisting of zinc oxide, silica, barium oxide and tin oxide.

12. An optical device package which comprises:
   a) a housing having a wall;
   b) an optical glass fiber in proximity to the housing wall, said optical glass fiber having a circumferential uncoated exterior surface;
   c) a quantity of fused solder glass fit in direct contact with and adhering to both at least a portion of the uncoated exterior surface of the optical glass fiber and at least a portion of the housing wall so as to secure the optical glass fiber in a fixed position with respect to the housing wall by forming a hermetic seal therebetween.

13. The optical device package of claim 12 wherein the housing is fabricated from a material selected from the group consisting of steel, copper, brass, aluminum, nickel, Kovar alloy, Invar alloy, copper-tungsten alloy, glass and ceramic.

14. The optical device package of claim 13 wherein the housing wall is an interior wall defining an axial aperture.

15. The optical device package of claim 14 wherein the optical glass fiber is disposed within said axial aperture and there is a gap between the exterior surface of the optical glass fiber and the interior wall of the housing.

16. The optical device package of claim 15 wherein the solder glass frit substantially completely occupies the gap between the exterior surface of the optical glass fiber and the interior wall of the housing so as to form said hermetic seal.

17. The optical device package of claim 16 wherein the optical glass fiber has a melting point of at least about 1000° C.

18. The optical device package of claim 17 wherein the solder glass frit has a melting point of no more than about 500° C.

19. The optical device package of claim 12 wherein said optical device package is a optical connector.

20. The optical device package of claim 12 wherein said optical device package comprises a transmitter or receiver of optically transmitted information carrying signals.

* * * * *